Patented Feb. 25, 1936

2,032,006

UNITED STATES PATENT OFFICE 2,032,006

METHOD OF RECOVERING CAROTENE FROM SOAPS

Robert J. Cross, Mason, Mich., assignor to S. M. A. Corporation, Cleveland, Ohio, a corporation of Ohio No Drawing. Application April 7, 1934, Serial No. 719,595

7 Claims. (Cl. 260—167)

This invention relates to a method for recovering, without the use of high temperatures, readily oxidizable or heat-sensitive substances from materials also containing a quantity of liquid which prevents direct extraction of the desired substances and must, therefore, be removed. More particularly, the invention relates to a method of extracting readily oxidizable plant pigment substances from wet materials without heating such materials to the temperature necessary to drive off water.

It frequently happens that appreciable quantities of valuable substances occur in by-products of industrial processes or in raw materials, the by-product or material being a wet mass from which the substances must be separated. Oftentimes the commercially available solvents for the desired substance either do not dissolve the substance in the presence of water or other liquid which may be present, or are miscible with the water or other liquid, so that it is necessary to dry the mass before it can be extracted. Where these desired substances are readily oxidizable or susceptible to heat, the drying cannot be carried on in the usual manner by heating, since the drying operation would destroy the substance either by the oxidation induced by heating in the presence of air or by the direct effect of the heat. In cases where the available solvents do not dissolve the substance in the presence of water or other liquid present, inability to apply heat prevents extraction of the wet mass and where the solvent may extract the substance from the wet mass but is miscible with water or other liquid present, a heating step would still be necessary to separate the two liquids after the extraction. Application of heat at sufficiently high temperatures would similarly defeat the purpose of the extraction since the substance in solution would still be subject to oxidation or other deleterious effect from heating. While drying may be carried on in the presence of inert atmospheres, the objectionable effect of prolonging heating on certain substances is still present and such inert atmospheres are difficult and expensive to maintain since the inert gas must be purified and returned to the process after being used. Lack of a suitable method for extracting these values has resulted up to the present in a loss of quantities of valuable substances of the foregoing description.

The present invention overcomes the difficulties in the way of recovering readily oxidizable and/or heat-sensitive substances from wet masses by providing a method in which high temperatures are not used. The mass is dried by adding thereto a material which has an affinity for water or other liquid which it is desired to remove and which takes up this water from the mass and retains it in harmless form under the conditions of temperature and pressure prevailing during the extraction of the mass. The material added is such that it can be incorporated with the wet mass to take up all of the liquid present, leaving a mixture which is substantially dry. Solvents for the pigments or other substances to be recovered can then be used to treat the dry mass and extract all of the pigments or other substances present.

It is, accordingly, an object of the present invention to provide a method of extracting readily oxidizable and/or heat-sensitive substances from masses containing the same in the presence of water or other liquid which prevents their extraction by commonly used solvents without the application of heat to dry the mass. Another object of the invention is to provide a method for the extraction of readily oxidizable plant pigments from wet materials containing the same by first mixing the material with a water-absorbing agent and then treating the dry mixture with a solvent for the plant pigments. Other objects of the invention will in part be obvious and will in part appear hereinafter.

Various desiccating agents or bibulous materials may be used for the purpose, including the anhydrous form of such salts as take up water of crystallization, specifically the alkali metal carbonates and particularly sodium carbonate or soda ash. Also, salts which form a series of hydrates may be used either in the anhydrous form or in the form of one of their lower hydrates which is capable of taking up additional water to form other hydrates. Absorbent materials which hold water in their pores may likewise be used, an example of such a substance being silica gel. Generally speaking, it may be said that any substance is useful for the purposes of the invention which does not deleteriously affect the desired product and which can take up water or other liquid and hold this in such form under the conditions prevailing during extraction, that the water or other liquid does not interfere with the action of the solvent used for the extraction or mix with it.

While the method is generally applicable to the extraction of wet materials containing substances which would be partially or wholly destroyed during the operation of drying by heat and which it is not practical to extract from the wet material, the method has been found particularly useful in the extraction of plant pigments, such as carotene, xanthophyll, chlorophyll, lycopin and the like, from wet materials with which they are associated. As an example of the application of the method to the extraction of such a plant pigment, the following example is given, although it will be understood that the same is for purposes of illustration only and the invention is not limited thereto.

A mass of wet soap containing the pigment carotene results from the practice of the method set forth in copending application Serial No. 674,777, filed June 7, 1933, the soap being formed during the treatment of an oil containing carotene with an alkali to remove free fatty acids. While the bulk of the carotene remains in the oil, appreciable quantities are removed with the soap which also contains a portion of the water used to dissolve the alkali in the saponification step. This soap has not previously been treated to recover its carotene content since it is quite wet and acetone or petroleum ether, these being solvents for the carotene, will not effect a separation from the formed solution or emulsion in the presence of water, unless, in the case of acetone, a disproportionately large amount of this solvent is used. Furthermore, acetone is miscible with water in all proportions and could not be used even where it might dissolve a substance of the aforementioned characteristics in the presence of excess water, because the substance would still be contained in an aqueous medium which would require the application of heat to remove the excess water, as well as further treatment to remove glycerine, and this heating, at the necessary high temperature, in the presence of air would destroy such a readily oxidizable substance. It has been found that the wet soap may be dried so as to leave a mass which is extractable with acetone, for example, by adding soda ash or anhydrous sodium carbonate to the wet soap. The soda ash takes up the water which is present and either forms one or more of its hydrates if the temperature is sufficiently low, the particular hydrate depending upon the quantity of soda ash added in proportion to the water present, or, at higher temperatures adsorbs the water on the surface of the soda ash without forming the hydrate. In either case, the water is held in a condition which does not interfere with the extraction and remains in this condition during the subsequent treatment with acetone, petroleum ether, or other solvent to dissolve out the carotene. The solvent may then be removed by methods which avoid oxidation and the carotene transferred to an oil or recovered as crystals.

As an example of the process, the following is given, but it will be understood that the same is by way of illustration and that the invention is not limited thereto, the process being applicable to soaps resulting from complete saponification of oils or to those resulting from neutralization of the free fatty acids, of oils, or to other masses containing plant pigments.

To 300 pounds of plantation palm oil 185 to 195 pounds of 34% caustic solution is added and the mixture maintained in a mixer provided with a steam jacket for about two hours until saponification is completed. The formed soap is then treated with 10 pounds or more of sodium bicarbonate, the mixture of soap and soda containing about 10 to 12% moisture or less. This mixture is then extracted with from 500 to 600 gallons of acetone and the acetone extract is reduced in volume to about 8 to 20 gallons and subsequently distilled under vacuum to remove the balance of the acetone, leaving a volume of liquid of about 8 to 10 or 12 gallons. Petroleum ether is added at this point to separate the pigment from the mixture of water, diacetone alcohol, and glycerine. The addition of six gallons of petroleum ether, followed by thorough stirring of the mixture to form a homogeneous solution and the addition of 4 gallons of water results in a separation into two layers. The petroleum ether, containing a very small amount of unsaponified oil, forms the upper layer and contains nearly all of the color or pigment. The lower layer contains the water, diacetone alcohol, and glycerine, together with a small amount of soap which occasionally goes through the process. The proportions of petroleum ether and of water added are more or less critical and an excess of water should be avoided since, if the balance of solvents is altered, the whole mass goes into a uniform emulsion and no separation occurs, or is very difficult. Observance of the proportions given results in a clear separation of the petroleum ether layer from the water layer and excellent recovery of pigment.

The residue from the foregoing extraction, after it has been deprived of its pigment, constitutes a soap powder since it contains the essential ingredients of such soap powder, mainly, soap and soda and may be used as such. This use for the residue may be kept in mind during the drying step and the soda ash added in proper proportions, with due regard to the necessity for thoroughly drying the soap preparatory to the extraction of the pigment, so that the residual mixture meets the commercial requirements for soap powder. If a gritty substance, such as silica gel, is used for the drying operation, the detergent remaining may be classed as a scouring soap rather than a soap powder and used as such. Of course, the residue may also be worked up by suitable additions of other materials, or of soap or soda, to meet the requirements of various detergent formulas. It will thus be seen that the invention provides a method for extracting readily oxidizable and/or heat-sensitive substances, such as plant pigments, from wet masses containing water or other liquid which interferes with or prevents the direct extraction of the wet mass, which method avoids the necessity for applying heat to remove such liquid. At the same time, where the wet mass is a soap, the residue is recovered as a valuable by-product in the form of soap powder or other detergent.

What I claim is:

1. The method of obtaining carotene from soap containing the same, together with water, which comprises adding to the soap a water absorbing agent which will not decompose the pigment, in an amount sufficient to take up and retain a sufficient amount of water to form a sensibly dry material, and then extracting the sensibly dry material with a solvent for the carotene.

2. The method of obtaining carotene from soap containing carotene in a free state, together with water, which comprises adding to the soap a water absorbing agent which will not decompose the pigment, in an amount sufficient to take up and retain substantially all of the water present, and then extracting the sensibly dry material with a solvent for the carotene which is not a solvent for the soap.

3. The method of producing carotene from a soap containing water, glycerine and carotene which comprises adding a water binding agent to the soap, extracting the carotene with acetone, heating to distill the acetone, agitating petroleum ether with the remaining liquid and then adding a small amount of water to cause stratification of the petroleum ether containing the carotene from the remainder of the liquid.

4. The method of producing carotene from a soap containing water, glycerine and carotene which comprises adding sufficient soda ash to the soap to form a sensibly dry material, extracting the pigment with acetone, heating to distill the acetone, agitating the remainder of the liquid with petroleum ether and then adding a small proportion of water to cause stratification of the petroleum ether containing the carotene from the remainder of the liquid.

5. A method of obtaining carotene from a wet soap containing the same which comprises adding soda ash to the soap in such amount as will take up enough of the water present to make extraction possible and retain the same as water of crystallization, and then extracting the mixture of soap and hydrate with a solvent for the carotene.

6. A method of obtaining carotene from a wet soap containing the same which comprises adding soda ash to the soap in such amount as will reduce the amount of sensible moisture present to a point where extraction with a solvent is possible and retain the same as water of crystallization, and then extracting the mixture with acetone to remove the carotene.

7. The method which comprises adding to a wet soap containing carotene a sufficient quantity of soda ash to combine with enough of the water present in the soap to make extraction possible, extracting the mixture with a solvent for the carotene to remove the same and recovering the residue as a soap powder or detergent.

ROBERT J. CROSS.